United States Patent [19]
Amdahl

[11] Patent Number: 5,653,548
[45] Date of Patent: Aug. 5, 1997

[54] METHOD AND APPARATUS FOR A BALL AND SOCKET JOINT

[75] Inventor: Samuel P. Amdahl, Palatine, Ill.

[73] Assignee: Illinois Tool Works Inc., Glenview, Ill.

[21] Appl. No.: 598,223

[22] Filed: Feb. 7, 1996

[51] Int. Cl.$^6$ .................................................. F16C 11/06
[52] U.S. Cl. ........................ 403/133; 403/122; 403/329
[58] Field of Search ............................. 403/122, 132, 403/133, 142, 144, 56, 76, 114, 329; 248/181.1, 181.2

[56] References Cited

U.S. PATENT DOCUMENTS

| | | | |
|---|---|---|---|
| 2,530,554 | 11/1950 | Tinnerman | 403/122 |
| 3,006,673 | 10/1961 | Swick | 403/122 |
| 3,367,728 | 2/1968 | Labbie | 403/135 X |
| 3,753,584 | 8/1973 | Kindel et al. | |
| 3,756,734 | 9/1973 | Nicholls | |
| 4,163,617 | 8/1979 | Nemoto | |
| 4,410,295 | 10/1983 | Ersoy et al. | |
| 4,457,188 | 7/1984 | Hauser | 403/114 X |
| 4,499,785 | 2/1985 | Bennett et al. | 403/141 X |
| 4,590,819 | 5/1986 | Spease et al. | 403/122 X |
| 4,993,863 | 2/1991 | Inoue | |
| 5,143,469 | 9/1992 | Cadeddu | |
| 5,165,306 | 11/1992 | Hellon | |
| 5,276,805 | 1/1994 | Ueno et al. | |
| 5,405,199 | 4/1995 | Mabuchi et al. | 403/140 X |

FOREIGN PATENT DOCUMENTS 1175494  8/1964  Germany .................. 403/131

*Primary Examiner*—Harry C. Kim
*Attorney, Agent, or Firm*—Schwartz & Weinrieb

[57] ABSTRACT

A method and apparatus for a ball and socket joint including a body member having an aperture coupled to a resilient ball container with a side wall extending from a first side of the body member to form an end portion. The side wall is disposed about at least a portion of the aperture wherein a ball disposed through the aperture is receivable in the resilient ball container. The resilient ball container has a substantially arcuate shaped inner surface portion with at least a portion of its side wall diameter being less than the diameter of the ball, wherein the ball contacts and outwardly expands the side wall of the resilient ball container and draws the end portion of the resilient ball container toward the ball as the ball is inserted into and retained in contact with the resilient ball container so as to provide a strong, durable and tight fitting joint. A resilient retaining member disposed on the first side of the body member extends into the resilient ball container so as to constrict the aperture. The resilient retaining member is outwardly flexible for increasing the aperture so as to permit disposal of the ball through the aperture and into the resilient ball container, and the resilient retaining member converges so as to constrict the aperture after the ball is inserted into the resilient ball container and thereby retain the ball between the resilient ball container and the resilient retaining member so as to provide a strong, durable and tight fitting joint.

20 Claims, 2 Drawing Sheets

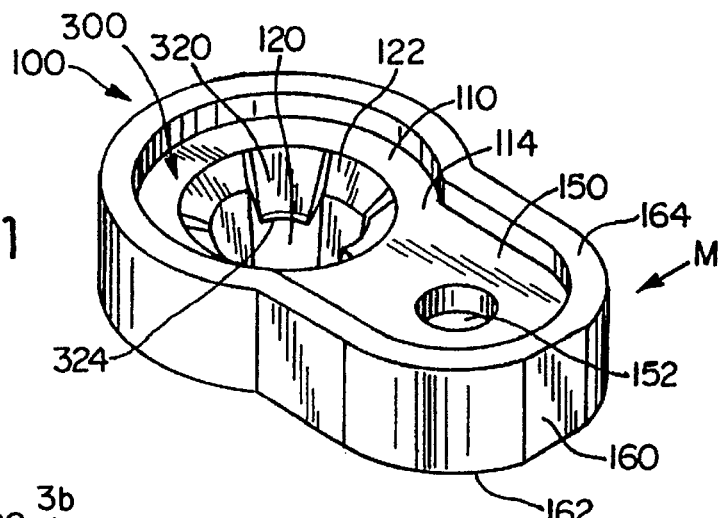
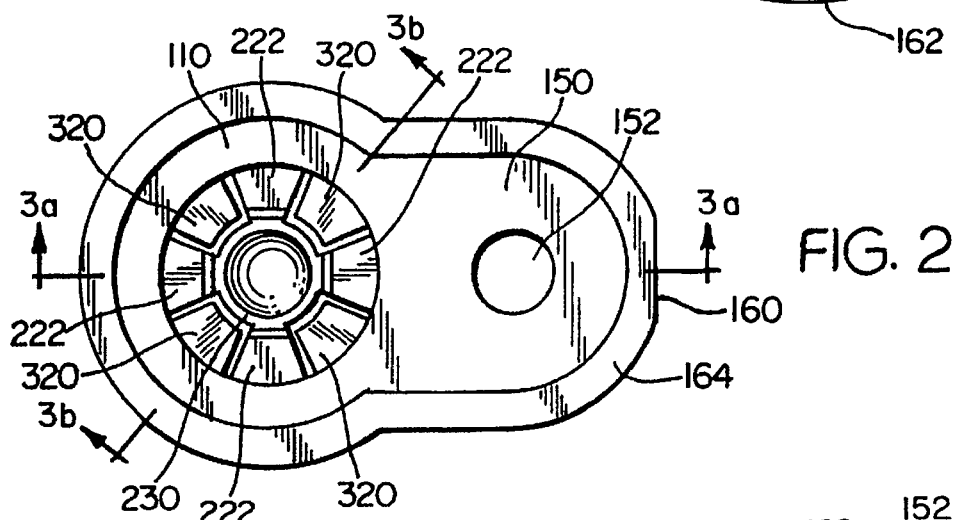
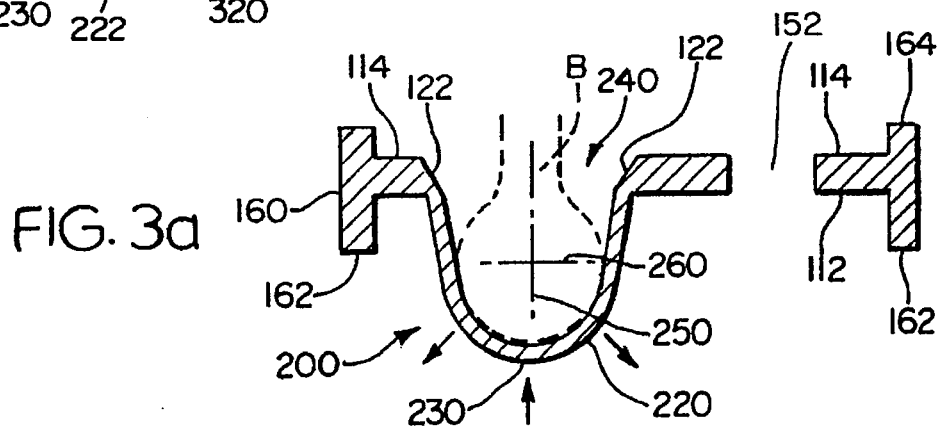
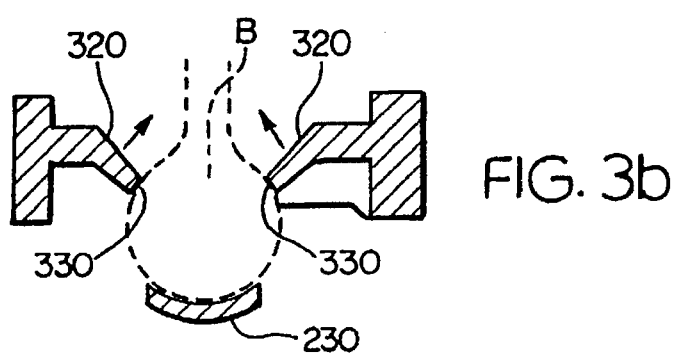

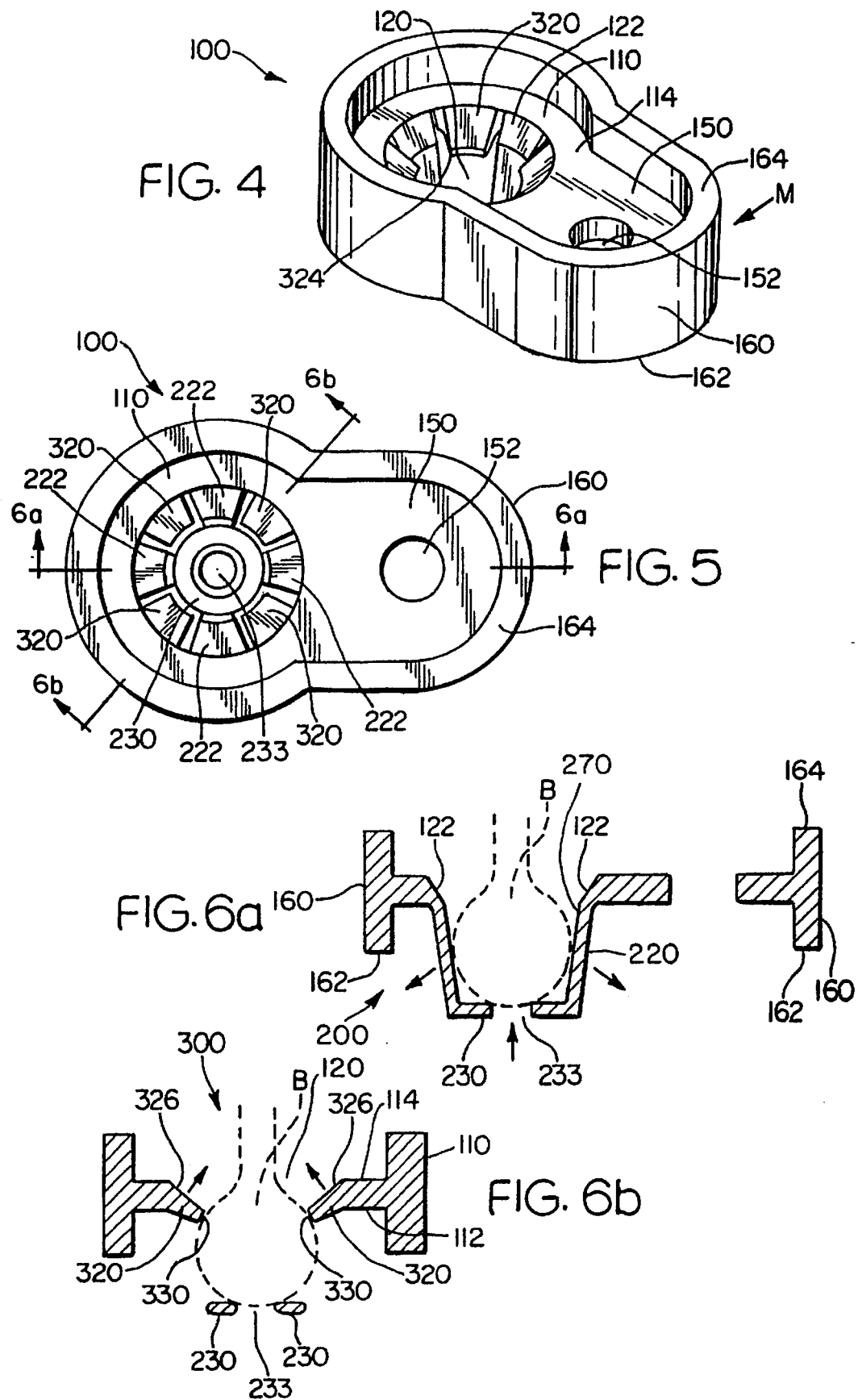

METHOD AND APPARATUS FOR A BALL AND SOCKET JOINT

FIELD OF THE INVENTION

The present invention generally relates generally to a method and apparatus for retaining a partially spherical ball portion in a socket so as to form a ball and socket joint, and more specifically for securely retaining a ball portion, which may have an irregular size and shape, between a resilient ball container and a resilient ball retainer of a durable unitary member for providing a tight fitting joint.

BACKGROUND OF THE INVENTION

Ball and socket joints have many well known applications and are tremendously successful in the market place. The joint usually comprises a spherical ball portion of a rod or other appendage that is disposed in a spherical cavity of a socket wherein the ball and socket have varying degrees of freedom to pivot and rotate relative to one another depending on the particular application. In some socket configurations, the ball is retained in the socket by a separate retaining ring that constricts an opening of the socket, or by a clamping member that retains a two-part socket assembled about the ball. Other configurations include a container that houses a separate resilient member with a cavity for receiving the ball. Multi-component sockets however have the disadvantage of requiring fabrication and assembly of the components, which increases costs and may pose reliability risks. A unitary socket which overcomes some of the disadvantages discussed above is disclosed in U.S. Pat. No. 4,993,863 to Inoue wherein resilient finger members originating near an equatorial portion of the socket have an outwardly flared skirt portion that forms an opening at one end of the socket for receiving the ball. The skirt portion and corresponding resilient finger members flex outward to permit insertion of a ball into the socket and then constrict to retain the ball in the socket. The resilient finger members however are tangentially arranged along the surface of the ball resulting in poor leverage for retaining the ball, which severely limits joint strength and therefore the scope of its practical application. U.S. Pat. No. 3,756,734 to Nicholls discusses a unitary socket having a generally cylindrical bore with opposing open end portions. Two rows of radially inwardly directed resilient projections with a concave end surface extend from the surface of the bore to define a spherical ball seating or socket between the rows. The resilient projections flex radially outward to permit insertion of the ball into the socket through the opening at either end portion and then constrict the opening to retain the ball in the socket. The rows of resilient projections, though more secure than the tangential resilient finger members discussed above, provide little contact surface area between the ball and the socket and therefore do not provide a very strong joint, particularly where ball forces are along the axial dimension of the bore toward the open end portions. These open-ended joints therefore are limited to applications where the ball forces are directed substantially radially outward toward the walls of the cylindrical bore whereas ball forces directed substantially along the axis of the bore toward either open end portion of the socket are likely to result in separation of the ball from the socket for lack of sufficient contact surface area between the ball and the resilient projections.

Another problem sometimes arises with prior art ball and socket joints during assembly of the joint, which is often performed by an automated system that inserts several balls into corresponding sockets in a single operation. In the assembly of ball and socket joints used for mounting automotive head lamps for example the sockets are fixed in a stationary mount while the balls are retained on a common moving member that simultaneously inserts or snaps the balls into the socket during an insertion step. In practice however the common moving member does not retain the balls in accurate alignment before the insertion step, which results in improper spacing between the ball and corresponding socket prior to assembly. When the pre-assembly spacing between the ball and socket is too large, the moving member may not fully insert the ball into the socket, and when the pre-assembly spacing between ball and socket is too small, the moving member may insert the ball too far into the socket, which results in damage or destruction to the socket. Damage to the socket due to excessive assembly force is particularly likely to occur in sockets that provide a insufficient contact surface area between the ball and socket, which is indicative of inadequate ball and socket joint strength. In the unitary socket of the type discussed in U.S. Pat. No. 4,993,863 to Inoue, excessive force on the ball during assembly or operation is likely to result in the ball being disposed into one side of the socket and out the other side of the socket due to lack of an adequately closed end portion for retaining the ball.

Ball and socket joint applications often require a tight fitting joint with little or no play between the ball and socket joint, wherein the components must be manufactured to close tolerances resulting in increased costs. Many spherical ball portions however are not at all spherical, but have irregular shapes and sizes usually resulting from the fabrication process. Balls formed by molding processes for example often have a flat surface, and balls formed by forging processes often have a flat surface and may vary in size and shape. Other balls are intentionally formed with a flat surface having a tool engagement slot or key for receiving a drive means such as a hex head, which is useful for assembly of an appendage extending from the ball. The irregularities in the shape and size of the ball and socket however result in a sloppy or loose fitting joint, which may have adverse consequences in a particular application. Automobile head lamp housings for example are usually adjustably mounted on a plurality of rods with ball portions seated in corresponding sockets mounted on the frame or other structure of the automobile. A loose ball and socket joint in this application results in unwanted vibration of the head lamp and a shimmering head light, which is annoying and possibly dangerous to motorists. Efforts have been made to securely retain the ball in the socket in other applications, but not without undue expense. U.S. Pat. No. 4,136,617 to Nemoto for example discusses a socket with a separate ball seat member biased into contact with the ball by a separate resilient spring member. As discussed above however this system has the disadvantage that it requires costly fabrication and assembly of its separate components.

OBJECTS OF THE INVENTION

In view of the discussion above, there exists a demonstrated need for an advancement in the ball and socket joint art. It is therefore an object of the present invention to provide a novel apparatus and method for a ball and socket joint that overcomes the problems in the prior art.

It is also an object of the invention to provide a novel apparatus and method for a ball and socket joint that is reliable and economical to manufacture.

It is another object of the invention to provide a novel method and apparatus for retaining a partially spherical ball in a socket having a resilient ball container that is deformable so as to contact a substantial surface portion of the ball and thereby provide a strong and durable joint.

It is a further object of the invention to provide a novel method and apparatus for retaining a partially spherical ball in a socket with a resilient ball retaining member that biases the ball toward and into contact with a resilient ball container so as to provide a strong, durable and tight fitting joint.

It is still a further object of the invention to provide a novel method and apparatus for retaining a partially spherical ball in a socket with a resilient ball retaining member that biases the ball toward and into contact with a resilient ball container so as to provide a tight fitting joint wherein the resilient ball container and the resilient ball retaining member comprises a unitary member.

SUMMARY OF THE INVENTION

Accordingly, the present invention is directed toward a method and apparatus for a ball and socket joint including a body member having an aperture coupled to a resilient ball container with a side wall extending from a first side of the body member and forming an end portion. The side wall is disposed about at least a portion of the aperture wherein a ball disposed through the aperture is receivable in the resilient ball container. The resilient ball container is deformable so as to contact at least a portion of the ball and thereby provide a strong and durable ball and socket joint. In one embodiment, the resilient ball container has a substantially arcuate shaped inner surface portion with at least a portion of its side wall diameter being less than the diameter of the ball, wherein the ball contacts and outwardly expands the side wall of the resilient ball container and draws the end portion of the resilient ball container toward the ball as the ball is inserted into and retained in contact with the resilient ball container. A resilient retaining member is disposed about at least a portion of the aperture for retaining the ball in the resilient ball container. The resilient retaining member is flexible so as to permit disposal of the ball through the aperture and into the resilient ball container and thereafter constricts the aperture and biases the ball toward and into contact with the resilient ball container so as to provide a strong, durable and tight fitting joint. In one embodiment, the resilient retaining member comprises a plurality of resilient tabs disposed on the first side of the body member, and each resilient tab includes an end portion extending into the resilient ball container so as to constrict the aperture. The resilient tabs are outwardly flexible away from one another for increasing the aperture so as to permit disposal of the ball through the aperture and into the resilient ball container, and the resilient tabs converge toward one another so as to constrict the aperture after the ball is inserted into the resilient ball container and thereby retain the ball between the resilient ball container and the end portions of the resilient tabs. The resilient tabs are outwardly flexible into corresponding recesses in the side wall of the resilient ball container so as to permit disposal of the ball through the aperture and into the resilient ball container.

BRIEF DESCRIPTION OF THE DRAWINGS

These and other objects, features and advantages of the present invention will become more fully apparent upon consideration of the following Detailed Description of the Invention with the accompanying drawings, which may include exaggerated proportions for ease of understanding, wherein like structure and steps are referenced by corresponding numerals and indicators, used throughout the several views, and wherein:

FIG. 1 is a perspective view of an apparatus for retaining a ball and forming a ball and socket joint according to one embodiment of the invention.

FIG. 2 is a top view of the apparatus of the embodiment of FIG. 1.

FIG. 3a is a sectional view taken along lines A—A of FIG. 2.

FIG. 3b is a sectional view taken along lines B—B of FIG. 2.

FIG. 4 is a perspective view of an apparatus for retaining a ball and forming a ball and socket joint according to an alternative embodiment of the invention.

FIG. 5 is a top view of the apparatus of the embodiment of FIG. 4.

FIG. 6a is a sectional view taken along lines A—A of FIG. 5.

FIG. 6b is a sectional view taken along lines B—B of FIG. 5.

DETAILED DESCRIPTION OF THE INVENTION

FIG. 1 is a perspective view of an apparatus 100 for retaining a ball B and forming a ball and socket joint according to one embodiment of the invention. The ball B as referred to herein is a spherical ball portion of a rod or some other appendage, and is more generally an irregular shaped or quasi-spherical ball portion that may also vary in size. The apparatus includes a body member 110 with an aperture 120 communicating with a resilient ball container 200 for receiving a ball B disposed through the aperture 120, and a resilient retaining member 300 for retaining the ball B in the resilient ball container 200. The aperture 120 in the body member 110 has a diameter that permits passage or disposal of the ball B through the body member 110 and into the resilient ball container 200. In one embodiment, the aperture 120 of the body member 110 includes a bevelled surface 122 about at least a portion of its perimeter to facilitate insertion of the ball B into and through the aperture 120. The body member 110 includes a first side 112 and an opposing second side 114, and is preferably a unitary member, which may be formed of a molded plastic material such as nylon, polyesters, acetal and poly-carbonate among many other materials. More specifically, the exemplary embodiments of the invention discussed herein are formable with a two-part mold, which does not require any mold slides and is particularly cost effective. The exemplary embodiments of the invention moreover form an integral part of a mounting bracket M, mountable on some structure not shown in the drawing. The mounting bracket M includes a body portion 150 extending from the body member 110 and having a mounting bore 152 through which a fastening means may be disposed to secure the bracket M to the mounting structure. In one embodiment, a flange 160 is disposed about a perimeter of the body member 110 including the body portion 150 to provide a mounting side and increase rigidity. A portion of the flange 160 protruding from the first surface 112 forms a first flange 160 mounting surface 162, and a portion of the flange protruding from the second side 114 forms a second flange mounting surface 164 and a recess for the fastening means disposed through the mounting bore 152. Although the exemplary embodiments of the apparatus 100 are shown integrated with a mounting bracket M, the apparatus is generally integratable with any other structure.

The resilient ball container 200 has a side wall 220 extending from the first side 112 of the body member 110 and forming an end portion 230, which in one embodiment is a partially closed end portion. The side wall 220 is at least partially disposed about the aperture 120 in the body member 110 so that a ball B disposed through the aperture 120 is receivable in the resilient ball container 200. The side wall 220 may be a continuous side wall or may be formed of a plurality of resilient arms, including at least two substantially opposing arms, which encompass a sufficient circumferential portion of the ball B to retain the ball B in the resilient ball container 200 so as to provide a strong, durable and tight fitting joint. The side wall 220 is configured to permit the resilient retaining member 300 to expand outwardly during insertion of the ball B through the aperture 120 in the body member 110 as further discussed below, and for this purpose may include a recessed portion or apertures in the side wall 220 proximate the aperture 120 in the body member 110. Other embodiments of the resilient ball container 200 may have an enlarged side wall diameter portion proximate the aperture 120 in the body member 110 so as to permit expansion of the resilient retaining member 300. In the exemplary embodiments, the side wall 220 is comprised of four resilient arms 222 separated by a space for accommodating the outwardly flexing resilient retaining member 300, which is readily formed with a two-part mold and provides a strong and durable socket. The resilient ball container 200 is deformable as the ball B is inserted therein to increase contact surface area between the ball B and the resilient ball container 200 and is particularly effective for increasing contact area with balls having irregular shapes and sizes so as to provide a strong, durable and tight fitting joint. The deformable characteristic of the resilient ball container 200 also prevents damage to the apparatus during insertion of the ball B into the socket in automated assembly operations, which have a tendency to damage prior art sockets.

In the embodiment of FIGS. 1–3, the resilient ball container 200 has a substantially arcuate shaped inner surface portion 240 with at least a portion of the side wall inner diameter be less than the diameter of the ball B so that the ball B contacts and outwardly expands the side wall 220 and draws the end portion 230 toward the ball B as the ball B is inserted into and retained in contact with the resilient ball B container 200 as indicated by the arrows in FIG. 3a. Ideal and over-sized spherical balls draw the end portion 230 of the resilient ball container 200 toward and into contact with the ball B so that substantially the entire semi-spherical end portion of the ball B contacts the resilient ball container 200 so as to provide a strong, durable and tight fitting joint. Irregular and under-sized balls that do not draw the end portion 220 into full contact with the end portion of the ball B however still contact the resilient ball container 200 over a substantial surface area of the semi-spherical end portion of the ball B, as shown in FIG. 3a. The substantially arcuate shaped inner surface portion of the resilient ball container 200 may for example have a substantially semi-elliptical shaped surface with a major axis 250 greater than the diameter of the ball B and a minor axis 260 less than the diameter of the ball B wherein the major axis 250 extends through the end 230 of the resilient ball container 200. In one application, the ideal spherical ball B has a diameter of approximately 10 cm, and the non-deformed semi-elliptical shaped inner surface portion of the resilient ball container 200 has a major axis of 10.2 cm and a minor axis of 9.8 cm relative to the geometrical center of the 10 cm spherical ball B. In an alternative embodiment, at least a portion of the arcuate shaped inner surface portion of the resilient ball container 200 has a diameter greater than the diameter of the ball B so that the ball B contacts and outwardly expands the end portion 230 and draws the side wall 220 toward the ball B as the ball B is inserted into and retained in contact with the resilient ball container 200. In this alternative embodiment, the contact surface area of the ball B extends from the end most portions of the ball B toward the ball equator so that a substantial portion of the semi-spherical end portion of the ball B contacts the resilient ball container 200 so as to provide a strong, durable and tight fitting joint.

In the embodiment of FIGS. 4–6, the resilient ball container 200 has a substantially cone shaped inner surface portion with at least a portion of the side wall inner diameter being less than the diameter of the ball B so that the ball B contacts and outwardly expands the side wall 220 and draws the end portion 230 toward the ball B as the ball B is inserted into and retained in contact with the resilient ball container 200 as indicated by the arrows in FIG. 6a. The tapering portion of the cone shaped inner surface portion 270 of the resilient ball container 200 is deformable about the ball B, and the truncated end portion 230 may have an aperture 233 for seating the ball B so as to increase the contact surface area between the end portion 230, and the ball B. Ideal and over-sized spherical balls B draw the end portion 230 of the resilient ball container 200 toward and into contact with the ball B so that a substantial portion of the ball B contacts the resilient ball container 200, as shown in FIG. 6a, to provide a strong, durable and tight fitting joint. Irregular and under-sized balls B that do not draw the end portion 230 into contact with the end portion of the ball B however still contact the resilient ball container 200 over a substantial surface area between the ball B and the side wall 220 of the resilient ball container 200 so as to provide a strong, durable and tight fitting joint.

The resilient retaining member 300 is disposed about the aperture 120 of the body member 110 so as to constrict the aperture 120 for retaining the ball B in the resilient ball container 200. The resilient retaining member 300 is outwardly flexible so as to enlarge the aperture 120 so as to permit disposal of the ball B through the aperture 120 and into the resilient ball container 200 wherein the resilient retaining member 300 biases the ball B toward and into contact with the resilient ball container 200 so as to provide a fight fitting joint, and the resilient ball container 200 deformably contacts the ball B over a substantial surface area of the ball B so as to provide a strong and durable joint. The resilient retaining member 300 may comprise a plurality of resilient tabs 300, including at least two substantially opposing resilient tabs 300, each having an end portion 330 extending into the resilient ball container 200 so as to constrict the aperture 120 of the body member 110. In the exemplary embodiments, the resilient retaining member 300 includes four resilient tabs 320 extending into the resilient ball container 200 from the first side 112 of the body member 110 and converging toward one another to constrict the aperture 120. The end portions 330 of the resilient retaining member 300 are positioned into the resilient ball container 200 to such an extent that permits the resilient tabs 320 to flex toward one another and back over the ball B so as to constrict the aperture 120 after the ball B is inserted into the resilient ball container 200, and at the same time the end portions 330 of the resilient retaining member 300 must retain the ball B in contact with the resilient ball container 200 so as to provide a strong durable and tight fitting joint. The resilient tabs 320 are also arranged or aligned with corresponding spaces in the side wall 220 or between resilient fingers of the resilient ball container 200 wherein the tabs 320 are outwardly flexible away from one another into the spaces as the ball B is disposed through the aperture 120 and into the resilient ball container 200. As the ball B is inserted into the resilient ball container 200 and the equatorial or largest diametral dimension of the ball B passes beyond the end portions 330 of the resilient tabs 320 and into the resilient ball container 200, the resilient tabs 320 flex back toward one another to constrict the aperture 120 and retain the ball B in the resilient ball container 200. The ball B outwardly flexes the resilient tabs 320 in the direction of the arrows shown in FIGS. 3b and 6b, and the tabs 320 impose a reaction force on the ball B so as to retain the ball B between and in contact with the resilient tabs 320 and the resilient ball container 200 for providing a strong, durable and tight fitting joint. The resilient tabs 320 provide a strong retention force on the ball B since the tabs 320 contact the ball B at angles that are aligned more along radial dimensions of the ball B than along tangents to the surface of the ball B. The end portions 330 of the resilient tabs 320 may have an arcuate shape so as to increase the contact surface area with the ball B, and the tabs 320 may have a bevelled surface 326 on the second side 114 of the body member 110 to facilitate disposal of the ball B into and through the aperture 120. Alternative embodiments may include a continuous retaining member, extending into the resilient ball container 200, that is outwardly flexible for enlarging the constricted aperture 120 to permit disposal of the ball B through the aperture 120 and that flexes back to constrict the aperture 120 and retain the ball B in the resilient ball container 200.

While the foregoing written description of the invention enables any one skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all of the embodiments within the scope of the appended claims.

What is claimed is:

1. An Apparatus for retaining a ball so as to form a ball and socket joint, said apparatus comprising:

a body member having an aperture defined therethrough such that said ball may be disposed through said aperture of said body member;

a resilient ball container defined by a side wall extending from said body member and an end portion, wherein said side wall is disposed about a portion of said aperture such that said ball disposed through said aperture of said body member may be received within said resilient ball container defined by said side wall and said end portion, and said end portion of said resilient ball container being disposed with respect to said body member for contacting a first hemispherical portion of said ball, which is disposed upon a first side of a predetermined diametrical plane of said ball, which is remote from said body member when said ball is disposed within said resilient ball container; and resilient retaining means integral with said body member and disposed about another portion of said aperture of said body member for retaining said ball within said resilient ball container;

said resilient retaining means being mounted upon said body member in a cantilevered manner and extending from said body member toward said end portion of said resilient ball container such that endmost surfaces of said resilient retaining means are spaced from said end portion of said resilient ball container for contacting a second hemispherical portion of said ball, which is disposed upon a second opposite side of said predetermined diametrical plane of said ball, which is adjacent to said body member, when said ball is disposed within said resilient ball container, and wherein said resilient retaining means are flexible so as to be deflectable by said ball as said ball passes through said aperture of said body member and into said resilient ball container and thereby permit disposal of said ball through said aperture defined within said body member and into said resilient ball container, and being substantially returnable to their non-deflected positions after said ball passes said resilient retaining means and is disposed within said resilient ball container such that said endmost surfaces of said resilient retaining means may be disposed in contact with said second hemispherical portion of said ball so as to maintain said ball within said resilient ball container when said ball is disposed within said resilient ball container.

2. The apparatus of claim 1, wherein:

said resilient retaining means comprises a plurality of resilient tabs extending into said resilient ball container so as to constrict the size of said aperture and being outwardly flexible away from one another so as to increase the size of said aperture and thereby permit disposal of said ball through said aperture and into said resilient ball container, and being convergent toward one another so as to constrict the size of said aperture after said ball has been inserted into said resilient ball container so as to retain said ball between said end portion of said resilient ball container and said endmost surfaces of said resilient tabs.

3. The apparatus of claim 2, wherein:

said resilient ball container has a truncated, substantially cone-shaped inner surface portion with at least a portion of its side wall diameter being less than a diameter of said ball disposable within said resilient ball container such that said ball disposable within said resilient ball container is able to contact and outwardly expand said side wall of said resilient ball container and draw said end portion of said resilient ball container toward said body member as said ball is inserted into and retained in contact with said resilient ball container.

4. The apparatus of claim 2, wherein:

said resilient ball container has a substantially arcuate-shaped inner surface portion with at least a portion of its side wall diameter being greater than a diameter of said ball disposable within said resilient ball container such that said ball disposable within said resilient ball container is able to contact and outwardly expand said end portion of said resilient ball container and draw said side wall of said resilient ball container radially inwardly as said ball is inserted into and retained in contact with said resilient ball container.

5. The apparatus of claim 2, wherein:

said resilient ball container has a substantially arcuate-shaped inner surface portion with at least a portion of its side wall diameter being less than a diameter of said ball disposable within said resilient ball container such that said ball disposable within said resilient ball container is able to contact and outwardly expand said side wall of said resilient ball container and draw said end portion of said resilient ball container toward said body member as said ball is inserted into and retained in contact with said resilient ball container.

6. The apparatus of claim 5, wherein:

said arcuate-shaped inner surface portion is a substantially semi-elliptical shaped surface with a major axis being greater than a diameter of said ball insertable into said resilient ball container, and a minor axis which is less than a diameter of said ball insertable into said resilient ball container, and wherein said major axis of said semi-elliptical shaped surface extends through said end portion of said resilient ball container.

7. The apparatus of claim 2, wherein:

said resilient tabs are outwardly flexible into corresponding recesses defined within said side wall of said resilient ball container so as to permit disposal of said ball through said aperture of said body member and into said resilient ball container, said endmost surfaces of said resilient tabs which are adapted to be disposed in contact with said ball, when said ball is disposed in said resilient ball container, have arcuate surfaces for mating with said second hemispherical portion of said ball disposed within said resilient ball container, and said resilient tabs have beveled surfaces for engaging said first hemispherical portion of said ball so as to facilitate insertion of said ball into said resilient ball container.

8. The apparatus of claim 7, wherein:

the body member comprises a unitary mounting member formed of plastic.

9. The apparatus as set forth in claim 7, wherein:

said side wall of said resilient ball container comprises a plurality of circumferentially spaced side wall portions; and said plurality of resilient tabs are circumferentially spaced with respect to each other and with respect to said plurality of side wall portions so as to be interposed between said plurality of side wall portions such that said plurality of side wall portions and said plurality of resilient tabs are alternately arranged with respect to each other in a circumferential array about said aperture of said body member.

10. The apparatus as set forth in claim 2, wherein:

said side wall of said resilient ball container comprises a plurality of circumferentially spaced side wall portions; and said plurality of resilient tabs are circumferentially spaced with respect to each other and with respect to said plurality of side wall portions so as to be interposed between said plurality of side wall portions such that said plurality of side wall portions and said plurality of resilient tabs are alternately arranged with respect to each other in a circumferential array about said aperture of said body member.

11. A method of forming a ball and socket joint, comprising the steps of:

providing a body member with an aperture;

providing a resilient ball container, for containing a ball member of said ball and socket joint, such that a side wall of said resilient ball container is disposed about said aperture and extends from said body member, and an end portion of said resilient ball container is disposed with respect to said body member so as to be in contact with a first hemispherical portion, of said ball member, which is disposed upon a first side of a predetermined diametrical plane, of said ball member, which is remote from said body member when said ball member is disposed within said resilient ball container;

providing resilient, flexible retaining means, upon said body member and disposed about said aperture of said body member, for retaining said ball member within said resilient ball container such that said resilient retaining means extend in a cantilevered manner from said body member and toward said end portion of said resilient ball container and have endmost surfaces which are spaced from said end portion of said resilient ball container so as to be disposed in contact with a second hemispherical portion, of said ball member, which is disposed upon a second opposite side of said predetermined diametrical plane, of said ball member, which is adjacent to said body member, when said ball member is disposed within said resilient ball container;

inserting said ball member through said aperture in said body member;

deflecting said resilient, flexible retaining means radially outwardly with respect to said aperture so as to permit insertion of said ball member through said body member and into said resilient ball container;

inserting said ball member into said resilient ball container; and permitting said resilient, flexible retaining means to substantially return to their non-deflected positions after said ball member has passed by said resilient, flexible retaining means and has been inserted into said resilient ball container such that said endmost surfaces of said resilient, flexible retaining means are disposed in contact with said second hemispherical portion of said ball member so as to retain said ball member within said resilient ball container.

12. The method of claim 11, further comprising the steps of:

providing said resilient retaining means as a plurality of resilient tabs wherein said endmost surfaces thereof extend into said resilient ball container so as to constrict the size of said aperture;

flexing said resilient tabs radially outwardly away from one another so as to increase the size of said aperture and thereby permit insertion of said ball member through said aperture of said body member and into said resilient ball container; and permitting said resilient tabs to converge back toward one another after said ball member has been inserted into said resilient ball container so as to retain said ball member within said resilient ball container as a result of said ball member being interposed between said end portion of said resilient ball container and said endmost surfaces of said resilient tabs.

13. The method of claim 12, further comprising the steps of:

providing said resilient ball container with a substantially arcuate-shaped inner surface portion wherein at least a portion of its side wall diameter is less than the diameter of said ball member; and outwardly expanding said side wall of said resilient ball container and drawing said end portion of said resilient ball container toward said ball member as said ball member is inserted into said resilient ball container.

14. The method of claim 13, further comprising the step of:

outwardly flexing said plurality of resilient tabs into corresponding recesses defined within said side wall of said resilient ball container so as to permit insertion of said ball member through said aperture of said body member.

15. A ball and socket joint, comprising:

a ball member;

a body member having an aperture defined therethrough and through which said ball member is to be disposed;

resilient ball container means, integral with said body member, for receiving said ball member and thereby defining with said ball member said ball and socket joint;

said resilient ball container means comprising a side wall, extending from said body member, and an end portion, wherein said side wall is disposed circumferentially about said aperture, and said end portion is disposed with respect to said body member so as to be in contact with a first hemispherical portion, of said ball member, which is disposed upon a first side of a predetermined diametrical plane, of said ball member, which is remote from said body member when said ball member is disposed within said resilient ball container means; and resilient retaining means, integral with said body member and circumferentially disposed about said aperture of said body member, for retaining said ball member within said resilient ball container means;

said resilient retaining means being mounted upon said body member in a cantilevered manner and extending from said body member toward said end portion of said resilient ball container means such that endmost surfaces of said resilient retaining means are spaced from said end portion of said resilient ball container means so as to be disposed in contact with a second hemispherical portion, of said ball member, which is disposed upon a second opposite side of said predetermined diametrical plane, of said ball member, which is adjacent to said body member, when said ball member is disposed within said resilient ball container means, and wherein further, said resilient retaining means are flexible so as to be deflectable by said ball member as said ball member passes through said aperture of said body member and into said resilient ball container means, so as to permit said ball member to be inserted into said resilient ball container means, and being substantially returnable to their non-deflected positions after said ball member has been inserted into said resilient ball container means such that said endmost surfaces of said resilient retaining means are disposed in contact with said second hemispherical portion of said ball member so as to maintain said ball member within said resilient ball container means.

16. The ball and socket joint as set forth in claim 15, wherein:

said resilient retaining means comprises a plurality of resilient tabs extending into said resilient ball container means so as to constrict the size of said aperture, and being outwardly flexible away from each other so as to increase the size of said aperture and thereby permit insertion of said ball member through said aperture and into said resilient ball container means, and being convergent toward one another so as to constrict the size of said aperture after said ball member has been inserted into said resilient ball container means so as to retain said ball member within said resilient ball container means as a result of said ball member being interposed between said end portion of said resilient ball container means and said endmost surfaces of said resilient tabs.

17. The ball and socket joint as set forth in claim 16, wherein:

said side wall of said resilient ball container means comprises a plurality of recesses defined therein for receiving said resilient tabs when said resilient tabs are flexed radially outwardly so as to permit said ball member to be inserted into said resilient ball container means.

18. The ball and socket joint as set forth in claim 16, wherein:

said side wall of said resilient ball container means comprises a plurality of circumferentially spaced side wall portions; and said plurality of resilient tabs are circumferentially spaced with respect to each other and with respect to said plurality of side wall portions so as to be interposed between said plurality of side wall portions such that said plurality of side wall portions and said plurality of resilient tabs are alternately arranged with respect to each other in a circumferential array about said aperture of said body member.

19. The ball and socket joint as set forth in claim 15, wherein:

said body member, said resilient ball container means, and said resilient retaining means comprise a one-piece molded plastic component.

20. The ball and socket joint as set forth in claim 19, wherein:

said one-piece molded plastic component is fabricated from a plastic material selected from the group comprising nylon, polyester, acetal, and polycarbonate materials.

* * * * *